United States Patent [19]

Engel

[11] Patent Number: 4,818,593
[45] Date of Patent: Apr. 4, 1989

[54] ULTRATHIN HETEROAROMATIC POLYMER FILMS AND PROCESS FOR MAKING THE SAME

[75] Inventor: Alan K. Engel, Bryn Mawr, Pa.

[73] Assignee: Research Development Corp. of Japan, Tokyo, Japan; a part interest

[21] Appl. No.: 10,479

[22] Filed: Feb. 3, 1987

[30] Foreign Application Priority Data

Feb. 7, 1986 [JP] Japan ................................ 61-24219

[51] Int. Cl.$^4$ .......................... B32B 7/02; C08G 12/04
[52] U.S. Cl. .................................... 428/220; 428/457; 428/460; 428/524; 428/525; 428/688; 528/265; 528/266
[58] Field of Search ................ 528/265, 266; 428/524, 428/525, 460, 457, 688, 220

[56] References Cited

U.S. PATENT DOCUMENTS

| | | | |
|---|---|---|---|
| 3,681,297 | 8/1972 | D'Alelio | 528/265 |
| 3,763,107 | 10/1973 | D'Alelio | 528/265 |
| 4,268,575 | 5/1981 | Shinozaki et al. | 428/460 |
| 4,405,678 | 9/1983 | Downing et al. | 428/460 |
| 4,529,651 | 7/1985 | Kitoo et al. | 427/131 |
| 4,690,857 | 9/1987 | Shirahata et al. | 428/695 |

OTHER PUBLICATIONS

K. Fukuda, Y. Shibasaki, H. Nakahara, J. Macromol. Sci. Chem. vol. A15, 999 (1981).
R. Ackermann et al., Makromol, Chem., vol. 175, 699 (1974).
M. Puterman et al., Journal of Colloid and Interface Science, vol. 47, 705 (1974).
B. Tieke, V. Enkelmann, H. Kapp, G. Lieser and G. Wegner in "Interfacial Synthesis, vol. III, Recent Advances," Marcel Dekker.
A. Cemel et al., J. Polym, Sci., Pt. A-1, vol. 10, 2061 (1972).
E. W. Neuse, M. S. Loonat, Macromolecules, vol. 16, pp. 128-136 (1983).
R. C. Evers et al., Macromolecules, vol. 14, pp. 925-930 (1981).
J. F. Wolfe et al., Macromolecules, vol. 14, pp. 909-915 (1981).
J. F. Wolfe et al., Macromolecules, vol. 14, pp. 915-920 (1981).
H. Vogel et al., Journal of Polymer Science: Part A, vol. 1, pp. 1531-1541 (1963).
H. Vogel et al., Journal of Polymer Science, vol. L, pp. 511-539 (1961).
J. Higgins et al, Journal of Polymer Science: Part A-1, vol. 8, pp. 171-177 (1970).
Y. Iwakura et al., Journal of Polymer Science: Part A, vol. 2, pp. 2605-2615 (1964).
J. P. Critchley, Die Angewandte Makromoleculare Chemie, vol. 109/110, pp. 41-80 (1982).
E. W. Neuse, Advances in Polymer Science, vol. 47, pp. 1-42 (1982).

Primary Examiner—George F. Lesmes
Assistant Examiner—James B. Monroe
Attorney, Agent, or Firm—Stephen F. K. Yee

[57] ABSTRACT

Unit layer polyheteroaromatic films of thickness less than 50 nm are obtained when an aldehyde monomer or aldehyde monomer precursor is spread onto an aqueous subphase containing an aromatic amine monomer, said aromatic amine monomer possessing amine or group VI heteroatom alcohols moieties in ortho (XH, NH$_2$) pairs, where X is N or a group VI heteroatom. The resulting film can be transferred and built up as multilayer films on various substrates.

14 Claims, 3 Drawing Sheets

ULTRATHIN HETEROAROMATIC POLYMER FILMS AND PROCESS FOR MAKING THE SAME

BACKGROUND OF THE INVENTION (a) Field of the Invention

This invention relates to ultrathin unit layer films and built-up multilayer films comprising a heteroaromatic polymer comprising repeat units of the formula

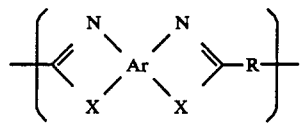

where R is aromatic, heteroaromatic, olefinic, acetylenic, or a mixture of these, where Ar is an aromatic nucleus, and where X is selected from the group consisting of NR', S, O, Se, and Te, where R' is H, aromatic, or aliphatic; said X being in ortho (X, N) pairs.

This invention relates to a process for the polycondensation synthesis of heteroaromatic polymers and the deposition onto selected substrates of said snythesized heteroaromatic polymers in the form of unit layers and built-up mulitlayers.

This invention relates to heteroaromatic polymer unit layer films and multilayer films possessing a heretofore unrealized degree of thinness.

(b) Definitions of Terms

By the phrase "unit layer" is meant the film or monolayer which is formed according to the teachings of this invention when a compound is spread onto an aqueous surface such that the thickness of the resulting layer is less than 50 nanometers or such that the surface area occupied per molecule is less than the cross sectional area of said molecule or which forms as a result of a subsequent reaction of said film. The phrase "unit layer" also applies to the above unit layer, which is on the subphase surface, after said unit layer is transferred onto a substrate. The thickness of a unit layer is less than 50 nanometers. If the molecules in the unit layer each span the thickness of said unit layer, than said unit layer can be called a "monolayer". The film which results from the one-by-one transfer of unit layers onto a substrate such that they become piled in a stack is called a "multilayer".

By the phrase "aldehyde monomer precursor" is meant a compound which is capable of generating an aldehyde monomer when spread onto an appropriate aqueous subphase according to the teachings of this invention.

(c) Description of the Prior Art

While heteroaromatic polymers, including those described in this patent specification, and films made therefrom are known to the art, uniform, well-controlled films of less than 0.1 micrometers in thickness cannot be made by previously known methods.

Melt phase, solid-state, and solution phase syntheses of heteroaromatic polymers are known to the art. Recent reviews of this art are those of E. W. Neuse, *Advances in Polymer Science*, Vol. 47, pp. 1–42 (1982) and J. P. Critchley, Die *Angewandte Makromoleculare Chemie*, Vol. 108/110, pp. 41–80 (1982). Representative references of the prior art in the synthesis of heteroaromatic polymers are Y. Iwakura, K. Uno, Y. Imai, *Journal of Polymer Science: Part A*. Vol. 2, pp. 2605–2615 (1964), J. Higgins, C. S. Marvel, *Journal of Polymer Science: Part A*-1, Vol. 8, pp. 171–177 (1970), H. Vogel, C. S. Marvel, *Journal of Polymer Science*, Vol. L, pp. 511–539 (1961), H. Vogel, C. S. Marvel, *Journal of Polymer Science: Part A*, Vol. 1, pp. 1531–1541 (1963), J. F. Wolfe, F. E. Arnold, *Macromolecules*, Vol. 14. pp. 909–915 (1981), J. F. Wolfe, B. H. Loo, F. E. Arnold, *Macromolecules*, Vol. 14, pp. 915–920 (1981), R. C. Evers, F. E. Arnold, T. E. Helminiak, *Macromolecules*, Vol. 14. pp. 925–930 (1981), and E. W. Neuse, M. S. Loonat, *Macromolecules*, Vol. 16, pp. 128–136 (1983). Heteroaromatic polymers are characterized by high melting point and low solubilities. Because of these properties, ultrathin films of heteroaromatic polymers have been heretofore unobtainable.

Also, while ultrathin unit layers and monolayer ploymer films are known to the art, heretofore, not only have these been limited to polymers not possessing, in the main chain, the heteroaromatic moieties which are objects of this invention, but also they have been limited to polymers soluble in spreading solvents or which possess pendant long alkyl side chains. The following references are considered representative of the prior art in the area of polymerized and multilayers: R. Ackermann, et al. *Kolloid-Z, Z. Polym.*, Vol. 2249, 1118 (1971), A. Cemel, et al. *J. Polym, Sci., Pt A*-1, Vol. 10, 2061 (1972), M. Puterman, et al, *Journal of Colloid and Interface Science*, Vol. 47, 705 (1974), R. Ackermann, et al, *Makromol, Chem.*, Vol. 175, 699 (1974), A. Dubault, et al, *J. Solid Films*, Vol. 68, 1 (1980), D. R. Day and H. Ringsdorf, *Makromol. Chem.*, Vol. 1880, 1059 (1979), B. Tieke, V. Enkelmann, H. Kapp, G. Lieser, and G. Wegner in "Interfacial Synthesis, Vol. III, Recent Advances, "Marcel Dekker: New York, 1981, K. Fukuda, Y. Shibasaki, H. Nakahara, *J. Macromol. Sci.,-Chem.*, Vol. A15, 999 (1981), and T. Folda, L. Gros, H. Ringsdorf, *Makromol, Chem., Rapid Commun.*, Vol. 3, 167 (1982). These references all deal with the polymerization of long chain aliphatic amphiphiles containing polymerizable groups such as vinyl, acrylic, and diacetylene moieties. These polymerizations are addition polymerizations which proceed via a free radical mechanism. The product polymer films retain the aliphatic nature of the starting monomers.

The polymers films and the process for making them, which are objects of this invention, differ from the prior art in the following respects. (1) The films of this invention may be wholly aromatic. (2) While the spreadable monomers described in this specification may have aliphatic chains attached to them, according to the process of this invention, these chains are eliminated from the final product film. (3) The polymerization process which is an object of this invention is a condensation type polymerization.

In a previous patent specification (Japanese Patent Unexamined Publication No. 108633/1986, U.S. Pat. No. 4,681,799, this inventor disclosed ultrathin films or polymeric imines synthesized at the air/water interface. While the invention described in the present specification is not bound by any theory, the mechanism for producing the ultrathin heteroaromatic films disclosed in this specification is thought to proceed through an imine intermediate by means of oxidative cyclodehydrogenation to the object heteroaromatic polymer films. Research on small molecules (K. H. Grellamnn and E. Tauer, *J. Am. Chem. Soc.*, 95, 3105 (1973)), found that an aromatic anil formed from an aldehyde and an aromatic amine will undergo oxidative cyclodehydrogenation when a suitable reactive group is ortho to the amine group of said aromatic amine. Anils in which said reactive group is NH$_2$, OH, or SH will form imidazoles, oxazoles, or thiazoles, respectively. A similar mechanism is thought to occur in the reaction forming the polymer films which are the object of this invention.

As mentioned above, uniform ultrathin films comprising a heteroaromatic polymer were not heretofore obtained. Ultrathin films comprising a polymer which is not soluble in spreading solvents and which has no alkyl side chains were also not heretofore obtained.

SUMMARY OF THE INVENTION

This invention offers ultrathin unit layers and built-up multilayer films comprising a heteroaromatic polymer.

Said heteroaromatic polymers can be made by a process which is also an object of this invention, namely, the synthesis at the air/water interface of a heteroaromatic polymer using spreadable aldehyde monomers or aldehyde monomer precursors and a subphase solution containing an aromatic amine monomer; said heteroaromatic polymer containing the heteroaromatic moiety

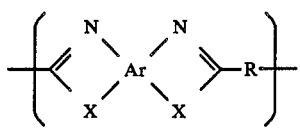

where R is aromatic, heteroaromatic, olefinic, acetylenic, or a mixture of these, where Ar is an aromatic nucleus, and where X is selected from the group consisting of NR', S, O, Se, and Te, where R' is H, aromatic, or aliphatic; said X being in ortho (X,N) pairs.

The aromatic amine monomer is of the formula

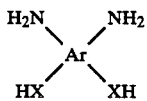

where Ar is an aromatic nucleus, and where X is selected from the groups consisting of NR', S, O, Se, and Te, where R' is H, aromatic, or aliphatic; said X being in ortho (XH, NH$_2$) pairs.

Preferable examples of Ar, aromatic nucleus, in heteroaromatic formula of the present invention are as follows:

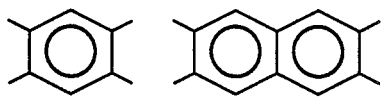
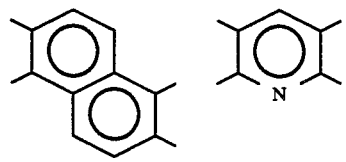

-continued

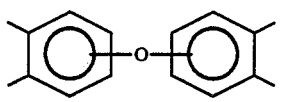
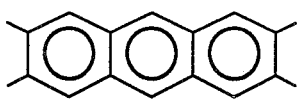
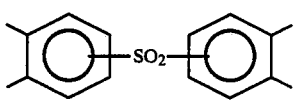
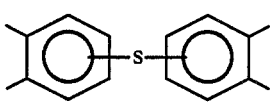
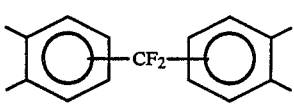
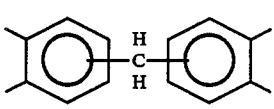
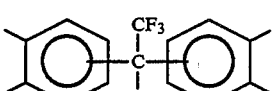
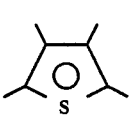 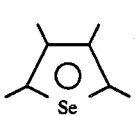 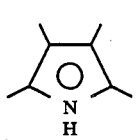

Examples of R in the formula are as follows:

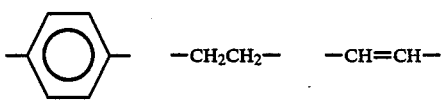
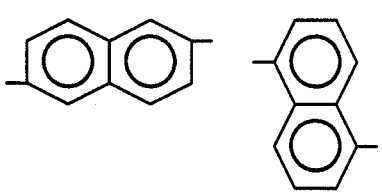

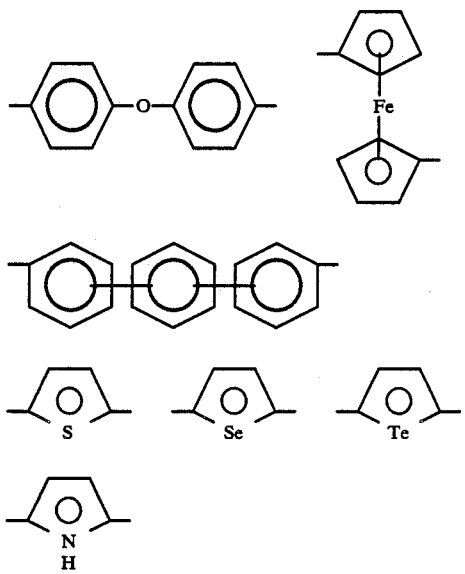

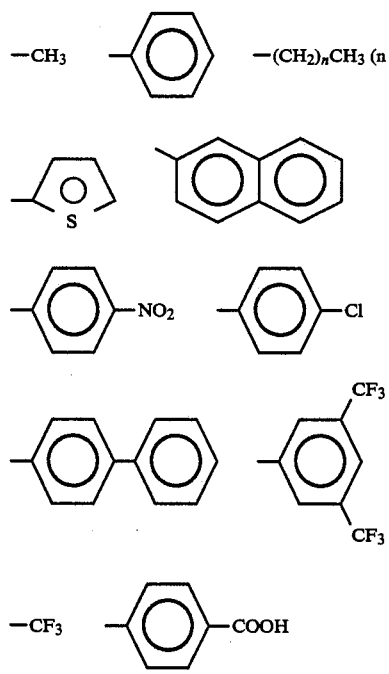

In the formula X is NH, NR′, S, O, Se or Te, where examples of R′ are as follows:

The degree of polymerization of the above heteroaromatic structure in the heteroaromatic polymer of the present invention may be one or more to infinity, generally 10 to 200, preferably 20 to 100.

According to the teaching of this invention, the heteroaromatic polymer can be synthesized by means of a polycondensation at the air/water interface, said polycondensation method also being an object of this invention. The starting materials for this polycondensation are spreadable aldehyde monomers or precursors of said aldehyde monomers, and aromatic amine monomers.

The aldehyde monomer precursor is preferably the Schiff base formed by condensation of the object aldehyde monomer and an alkyl amine. Examples of aldehyde monomers which can be used include terrephthaladehyde, isophthalaldehyde, 5-nitrobenzene-1,3-dicarboxaldehyde, 5-chlorobenzene-1,3-dicarboxaldehyde, 2,4-hexadiyne-1,6-dial, 2,4-hexadiene-1,6-dial, 5-methylbenzene-1,3-dicarboxaldehyde, 4,4′-stilbenedialdehyde, malonaldehyde, azobenzene-3,5-dicarboxaldehyde, azobenzene-4,4′-dicarboxaldehyde, bibenzyl-4,4′-dicarboxaldehyde, naphthalene-1,4-dicarboxaldehyde, naphthalene-2,6-dicarboxaldehyde, diphenylether-4,4′-dicarboxaldehyde, (phenylendioxy) dibenzaldehyde, pyridine-2,6-dicarboxaldehyde, 1,4-butynedialdehyde, and succinaldehyde.

Examples of aromatic amine monomers which can be used are as follows:

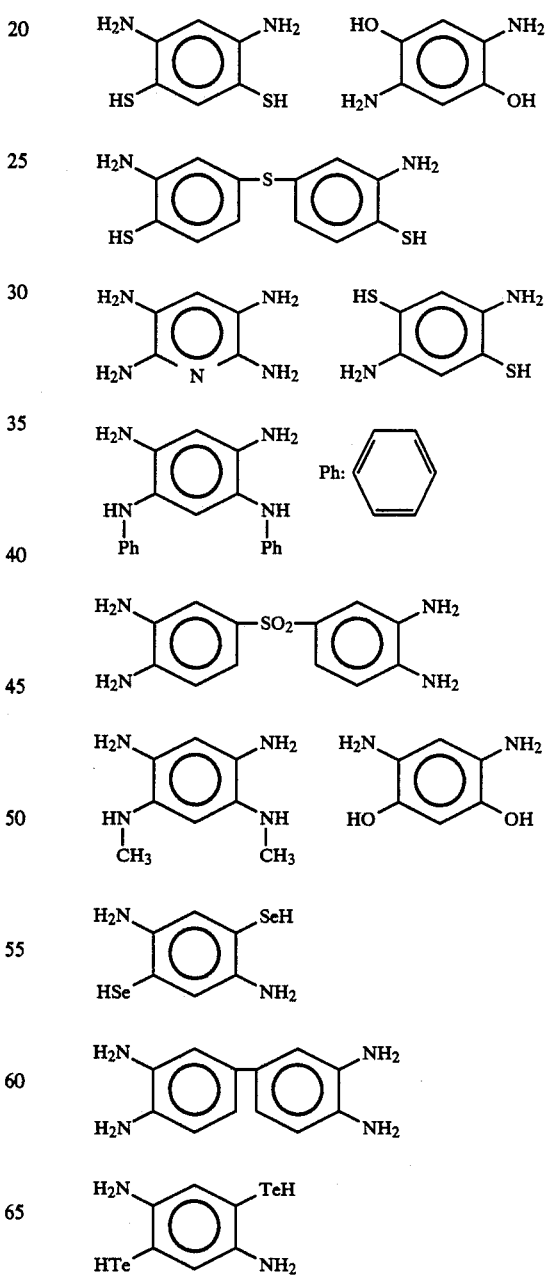

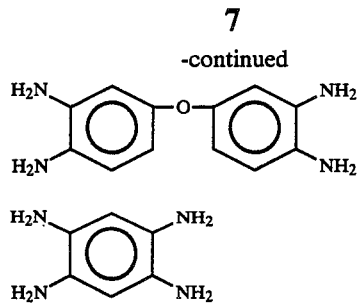
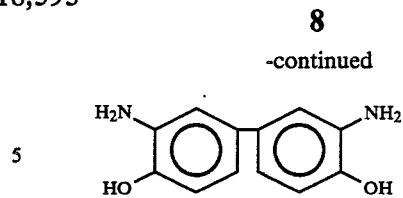
Examples of heteroaromatic polymers which can serve as constituent units of the films which are objects of this invention are as follows:
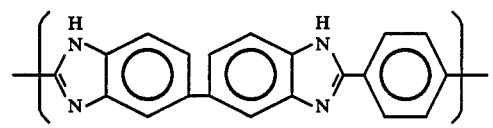
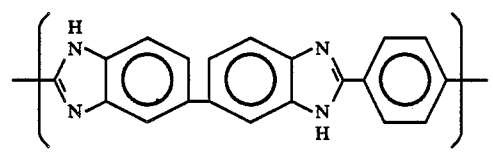
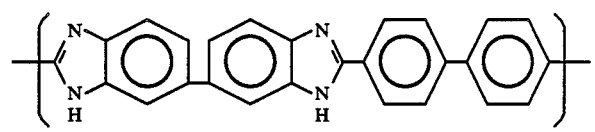
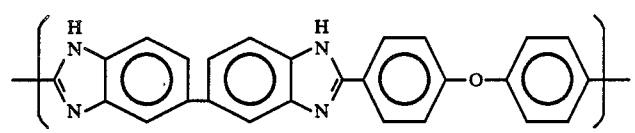
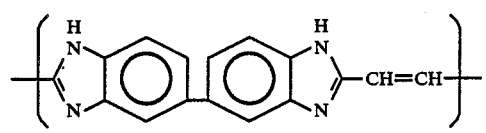
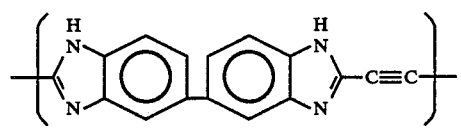
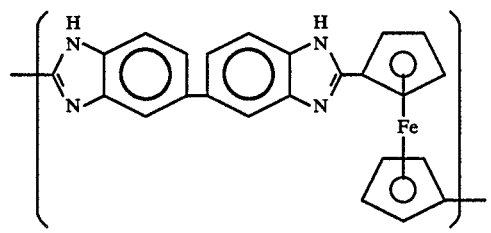
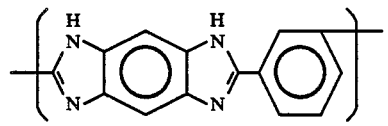

-continued
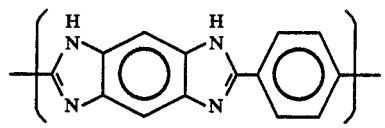
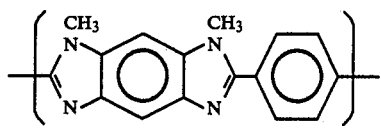
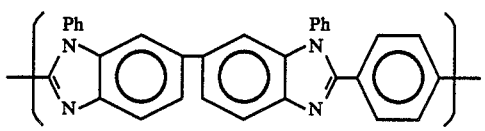
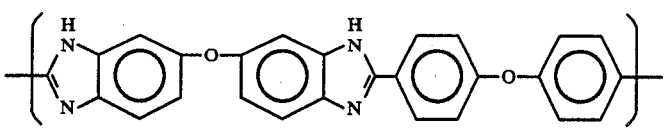
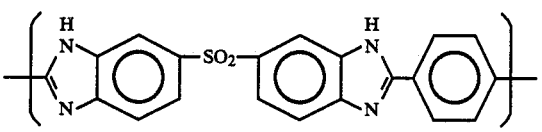
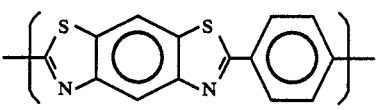
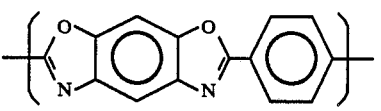
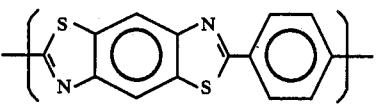
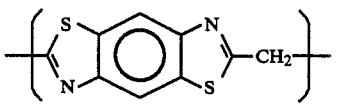
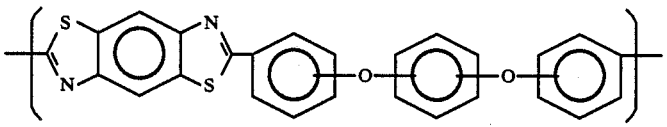
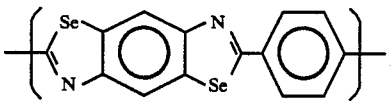
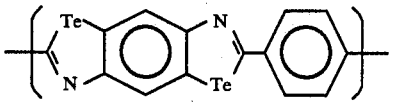

-continued

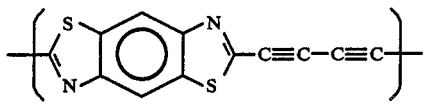

The process which is an object of this invention involves spreading an aldehyde monomer or a precursor of said aldehyde monomer on the surface of an aqueous solution containing one or more aromatic amine monomers. The spread layer which is formed at the surface of the solution is allowed to react with the subphase to produce the desired heteroaromatic polymer unit layer.

The resulting unit layer is transferred to the desired substrate by either the Langmuir-Blodgett method or, preferably, by a horizontal lifting method. The Langmuir-Blodgett method is known to the art and is described in several publications including K. Fukuda, T. Ishii, "Hakumaku (Thin Films)", Shin Jikken Kagaku Koza, Vol. 18, Kaimen to Korodio (Interfaces and Colloids), (Maruzen, 1975), Chap. 6, pp. 439–516.

Simply stated, the Langmuir-Blodgett method involves compressing the unit layer which is at the water surface by means of an enclosure. Usually this enclosure is formed by the sides of a trough, which contains the subphase, and two barriers. The compression is maintained at a constant value. This can be accomplished by means of a waxed thread and a piston oil, but nowadays is usually achieved with automated troughs such as those manufactured by Lauda, Kyowa Science, Takahashi Seiki, Joyce-Loebl, and others. While a constant surface pressure is being applied, the substrate, held vertically, is raised and lowered through the subphase surface. The unit layer is transferred to the substrate, either during raising (Z-type), lowering (X-type), or both (Y-type). The preferred raising and lowering speeds are described below.

According to the preferred horizontal lifting method, the surface area for the reaction is held constant with no compression during the reaction or during lifting of the resulting film. Prior to performing the synthesis of the polymer film, a mask is prepared. The mask is a sheet of inert material such as "Teflon" polytetrafluoroethylene. In this sheet are holes cut to match the substrate onto which the polymer film is to be deposited. In performing the synthesis, the solution of aldehyde monomer or a precursor of the aldehyde monomar is spread dropwise onto the surface of the substrate. The solvent evaporates, leaving an ultrathin, preferably less than 10 nm thick, film of monomer. The mask is laid on top of this reacting film. After a suitable reaction time, the resulting polymer film is transferred to the desired substrate by contacting the substrate to said film. The substrate is then raised bringing the film with it. This transfer step can be repeated to build up a multilayer polymer film of desired thickness.

In either method, the subphase may be changed prior to transferring the film in order to provide optimum conditions for said transfer. In the case of the Langmuir-Blodgett method, the subphase is preferably replaced with distilled water.

After transfer, the unit layer or built-up multilayer can be optionally heat treated. This step is preferably carried out in air at a temperature above 230° C. Although this invention is not bound by any theory, the film which forms at the air/water interface is thought to contain both the object heteroaromatic moieties and aromatic anils which undergo oxidative cyclodehydrogenation to form the corresponding heteroaromatic ring. The heat treatment is thought to drive this oxidative cyclodehydrogenation to completion.

According to the teachings of this invention, the aldehyde monomer or its precursor is spread onto the surface of a reactive aqueous subphase. The criteria for the spreading of organic compounds on water surfaces are generally known to the art (see, for example, A. W. Adamson, "Physical Chemistry of Surfaces," 4th ed. (Wiley. New York, 1982) Chapter IV, or G. L. Gaines, Jr., "Insoluble Monolayers at Liquid/Water Interfaces," (Wiley, New York, 1966) Chapter 4). Briefly, for a compound to be spreadable, the attractive forces between the compound and the water surface must be strong enough to overcome the cohesive forces of the compound itself. Otherwise the compound will simply crystallize on the water surface and will not spread, such as is the case for terephthalic acid. In the case of organic liquids, the equilibrium situation is considered to be a monolayer with excess liquid collecting in the form of lenses on the surface (A. W. Adamson, "Physical Chemistry of Surfaces." 4th ed. (Wiley, New York, 1982) p. 106). Also, for the compound to be spreadable for the purposes of this invention, the compound must be insoluble enough and involatile enough so that it will remain at the surface for the duration of the reaction. According to the teaching of this invention, aldehyde monomers which are spreadable themselves, especially those in the liquid state, can be used directly. Aldehyde monomers which do not spread at the air/water interface are, according to the teachings of this invention, converted to a precursor of the aldehyde monomer which can be spread at the air/water interface. This is preferably accomplished by condensing the object aldehyde monomer with an alkyl amine so as to form the corresponding precursor, in this case an aldimine. The alkyl group is preferably one which results in said precursor being a liquid and is preferably an alkyl amine of 4–10 carbon atoms.

According to the teachings of this invention, the aldehyde monomer or its spreadable precursor is applied by means of a spreading solvent. Although this invention is not bound by any theory, it is thought that the spreading solvent serves mainly to separate the object monomer molecules enough that they can interact individually with the water surface. The use of a spreading solvent is also advantageous in controlling the amount of compound applied to the subphase surface. The preferred properties of spreading solvents are known to the art (see, for example G. L. Gaines, Jr., "Insoluble Monolayers at liquid-Gas Interfaces," (Wiley, New York, 1966). These are that it be volatile enough that it evaporates quickly, preferably within less than one minute of spreading, that it spreads by itself on the water surface without formation of stable lenses, that it dissolve the compound to be spread, and that it be essentially insoluble in the subphase. Preferred solvents which possess thes properties include chloroform, toluene, benzene, dichloroethane, and mixtures of hexane or heptane with diethyl ether.

The preferred concentration of the aldehyde monomer or its precursor in the spreading solvent is between 0.001 and 0.1 wt%, these concentrations providing sufficient control of quantity. According to the teachings of this invention, the solution of the aldehyde monomer or its precursor, preferably in chloroform, is spread on the subphase in a quantity sufficient to yield, upon evaporation of the spreading solvent, a final area per molecule greater than 0.2 nm$^2$.

The subphase is preferably made from highly purified water, preferably distilled with a predistillation pass through an ion-exchange column, charcoal filter, and membrane filter, preferably in that order.

According to the teachings of this invention, the aromatic amine monomer is dissolved in the subphase to a concentration preferably between 0.3 and 30 millimolar. The preferred pH is between 3.5 and 5. The subphase solution is preferably made from an acid salt of the aromatic amine monomer with pH adjustment with NaOH or KOH.

The method which is an object of this invention can be conducted with one of several commercially available film balance troughs. The trough is preferably less than one centimeter deep and is made of materials which will not react with the subphase and will not release contaminants. The preferred materials are fluoroplastics or fluoroplastic-coated metals.

According to the teachings of this invention, after the polycondensation has occurred, the resultant polymer unit layer can be transferred to a substrate. The preferred substrates are hydrophilic ones in the case of Langmuir-Blodgett deposition. In the case of horizontal lifting, any substrate can be used.

Substrates are best cleaned before transfer. Several suitable cleaning procedures are known to the trade (see, for example, G. Goldfinger, ed., "Clean Surfaces: Their Preparation and Characterization for Interfacial Studies", (Marcel Dekker, New York, 1970).

In the case of Langmuir-Blodgett deposition, according to the teachings of this invention, the deposition of the first unit film layer is most critical. The substrate is lowered into the subphase through the surface unit layer at a speed preferably between 5 and 20 cm/min. Either during this lowering or after it, a constant surface pressure, preferably between 15 and 25 mN/m, is applied to the surface unit layer. After initial application of the constant surface pressure, the surface is preferably allowed to relax under pressure, preferably for a minimum of two hours. The substrate is then withdrawn out of the subphase at a speed preferably less than 1 cm/min. The transfer of the polymer film to be substrate can be monitored by observing the decrease in surface area under constant surface pressure. Before deposition of subsequent layers, the adhesion of the first layer to the substrate can be improved by aging it, preferably for more than two hours. Subsequent layers are transferred as for the first layer, the preferred lifting speed being between 0.5 and 2 cm/min.

The ultrathin heteroaromtic polymer films which are objects of this invention and which are obtained by means of the process which is also an object of this invention possess several special, useful properties, including high heat stability, high hardness, chemical stability, solvent resistance, and transparency.

EXPERIMENTAL EXAMPLES

In the following examples, the Langmuir-Blodgett trough used is a Lauda-brand "Filmwaage" having a 200 cm×15 cm×0.6 cm "Teflon" coated trough. Ellipsometer measurements are made with a Shimadzu EP-10 ellipsometer equipped with a He-Ne laser light source.

EXPERIMENTAL EXAMPLE 1

Figure 1:
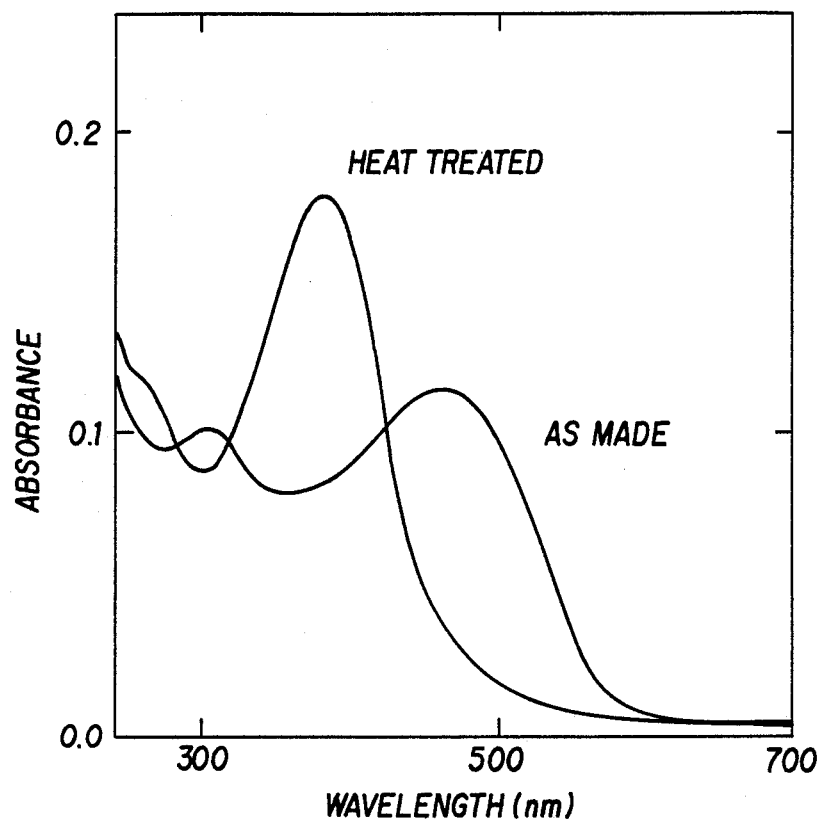
FIG. 1 shows the UV-vis spectra of a multilayer film prepared according to Experimental Example 1 as made and after heat treatment.

A subphase solution of 3,3'-diaminobenzidine is prepared by dissolving the tetrahydrochloride salt to a concentration of 3.2 millimolar in doubly distilled water then adjusting the pH to 4.5 with 0.1N NaOH. This is placed in the film balance trough and the temperature equilibrated at 20° C. Dihexylterephthalaldimine is deposited dropwise from a 1.04 mM solution in chloroform to a final area of 0.22 nm$^2$ per molecule. According to a horizontal lifting method, onto this surface is placed a mask cut from an 0.7 mm thick "Teflon" sheet. (The mask is prepared ahead by cutting in it a grid of 4 cm×1 cm holes.) After waiting 10 min, five unit layers are built up on a 4 cm×1 cm×0.2 cm fused silica optical flat as follows. First, the plate is suspended by suction horizontally over the trough. The plate is then lowered rapidly through a hole in the mask until it touches the film. The plate is then raised immediately, turned vertically, and the film-covered surface rinsed with triply distilled water. The washed film is allowed to dry, then the plate returned to its original horizontal position. This cycle is repeated until a five-layer film is obtained. The UV-vis spectrum of a film made according to this example is shown in FIG. 1 and is the "as made" spectrum. The 480 nm absorbance indicates an aromatic polyanil. This film is then heat treated in air at 250° C. for 20 min. A spectrum of this film is shown in FIG. 1, the 370 nm absorbance of the "heat treated" film indicating the aromatic benzimidazole moiety of the target polymer.

A film is also built up onto a Ge plate for measurement of thickness by ellipsometry. In this case the Ge plate is a Brewster window and is 4 cm×1.25 cm×0.2 cm. A 78-layer multilayer film is built-up on this plate followed the same procedure as for the fused silica plate. After every sixth layer is deposited, the ellipsometric constants are measured. After calculating the refractive index and the absorbance factor by means of the Drude equations, the thicknesses corresponding to each set of measurements is calculated. The average thickness per unit layer of this film is 2.8 nm, the refractive index, 1.9, and the absorbance factor, k, 0.5.

EXPERIMENTAL EXAMPLE 2

Figure 2:
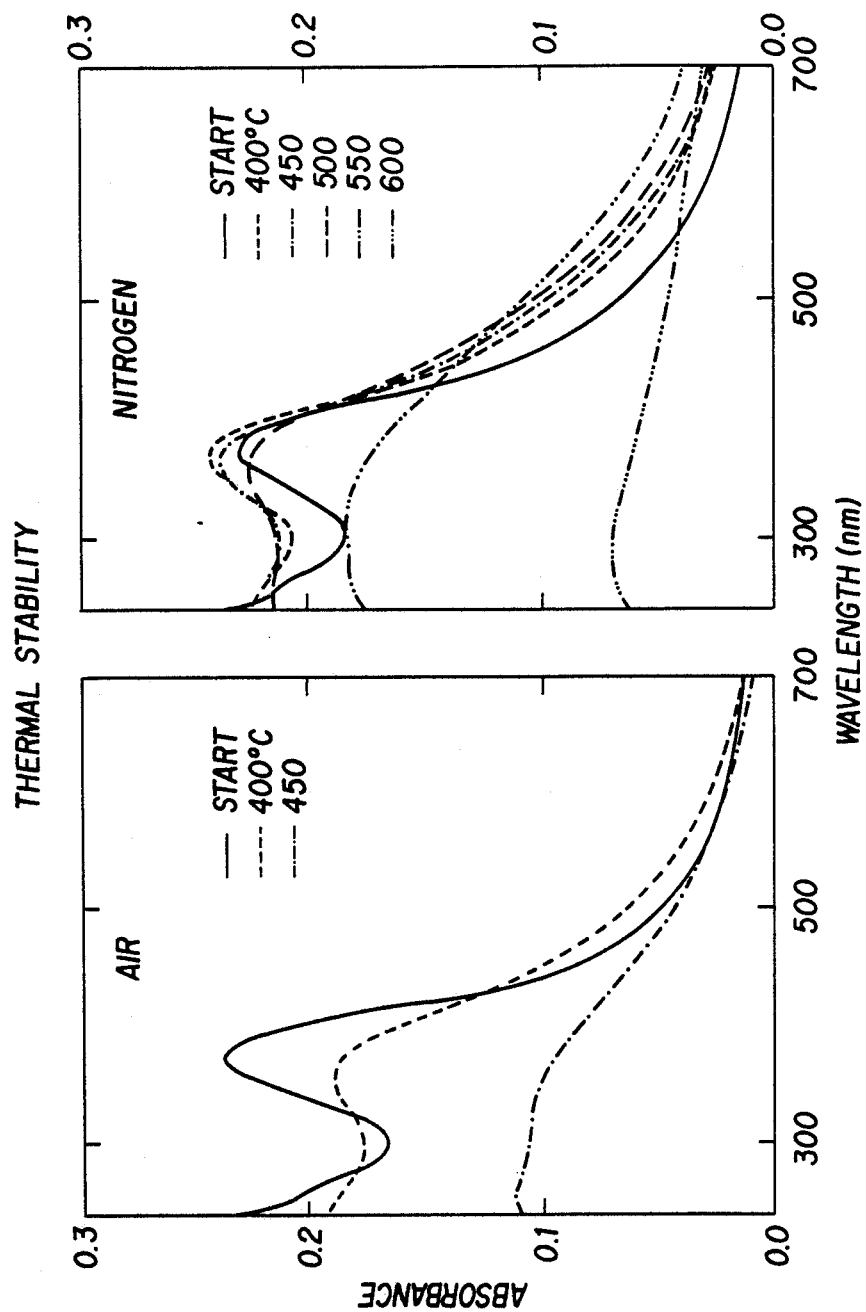
FIG. 2 shows the UV-vis spectra of multilayer film samples prepared according to Experimental Example 2 before and after heat treatment in air or nitrogen at high temperatures.

The procedure of Experimental Example 1 is followed except that six-layer films are built up on fused silica optical flats. These films are then heat treated at 270° C. in air for 15 min. One multilayer film is heat treated for sequential one-hour periods in air at 400° and 450° C. After each heating, the UV-vis spectrum is taken. Another mulitlayer film sample is likewise heated for sequential one-hour periods in a nitrogen atmosphere at 400°, 450°, 500°, 550°, and 600° C. with UV-vis spectra taken after each heat treatment. The thusly obtained spectra, shown in FIG. 2, show the high thermal stability of these aromatic polybenzimidazole films.

EXPERIMENTAL EXAMPLE 3

Figure 3:
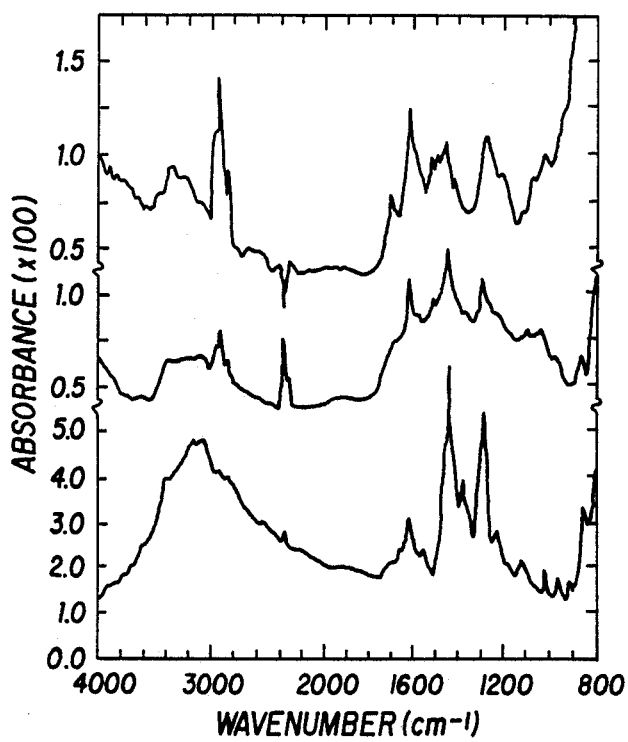
FIG. 3 shows the FTIR spectra of the multilayer film prepared according to Experimental Example 3 before heat treatment (top), after heat treatment (middle), and the spectrum of a film prepared according to Comparative Example 1.
Figure 4:
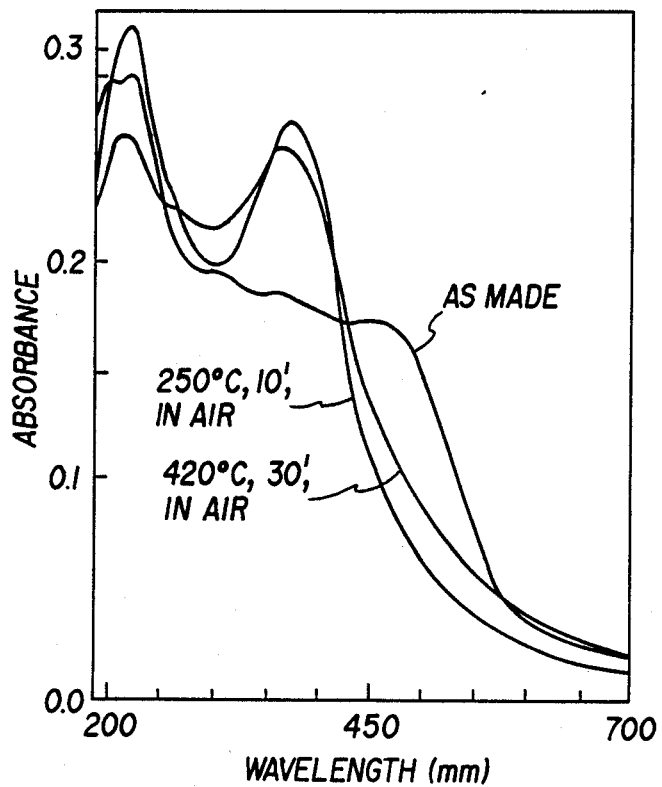
FIG. 4 shows UV-vis spectra of a multilayer film prepared according to Experimental Example 3 as made, and after heat treatments in air at 250° C. and 420° C.

A subphase solution of 3,3'-diaminobenzidine is prepared by dissolving the tetrahydrochloride salt to a concentration of 3.2 millimolar in doubly distilled water then adjusting the pH to 4.0 with 0.1N NaOH. This is placed in the film balance trough and the temperature equilibrated at 20° C. Dihexylterephthalaldimine is deposited dropwise from a 1.04 mM solution in chloroform to a final area of 1.2 nm² per molecule. The reaction is allowed to proceed overnight with the subphase temperature maintained at 20° C. The reaction is terminated by passing 8 liters of doubly distilled water under the film. The resulting film is compressed to 20 millinewtons per meter surface pressure and maintained at this pressure overnight. The film is then deposited onto calcium fluoride plates which are first cleaned in sulfuric acid/30% hydrogen peroxide (4:1, v/v) followed by profuse washing with doubly distilled water. The first layer is transferred by lowering the plates vertically through the film at 10 cm/min, then raising the plates at 0.5 cm/min. The plates are then set aside for two hours after which deposition is continued at the same lowering and raising speed as for the first layer. Transfer occurs primarily on the upstroke. A multilayer film containing 20 layers yields the FTIR spectrum at the top of FIG. 3. After heating in air at 250° C. for 10 min, the film gives the FTIR spectrum in the middle of FIG. 3. Layers are transferred from the water surface to fused silica plates in the same manner as for the calcium fluoride plates. Thusly obtained multilayers give the electronic spectrum shown in FIG. 4 before heat treatment (as made), after heat treatment in air at 250° C. for 10 min, and after heat treatment in air at 420° C. for 30 min. The existence of poly(1,4-phenylene-5,5'(6,6')-bibenzimidazole-2,2'-diyl) is established by the 1450 and 1290 cm$^{-1}$ absorbances in the FTIR spectra and by the 370 nm absorbance in the electronic spectra.

EXPERIMENTAL EXAMPLE 4

The procedure of Experimental Example 1 is followed except rather than placing a mask over the surface, product film is collapsed and picked up with a 2 cm×0.5 cm×0.1 cm glass slide. This slide with the gathered film is then heat treated at 250° C. in air for 15 min. The slide is then placed in a 2.0 cm×1.0 cm cuvette (path length—0.2 cm). To this is added 0.3 ml of dimethylformaide containing 3 wt% LiCl. The resulting polymer solution is filtered and injected into a Waters Model 150C gel permeation chromatograph equipped with three columns in series, Shodex AD802/S, Shodex AD804/S, and Shodex AD806/S. The eluting solvent is dimethylformamide containing 3 wt% LiCl. The polymer elutes with a peak molecular weight of 24,000 (degree of polymerization 60) (calibrated against poly(ethylene oxide) and poly(ethylene glycol). From the elution curve, it is determined that this polymer sample has an inherent viscosity of 0.2.

COMPARATIVE EXAMPLE 1

A sample of poly(1,4-phenylene-5,5'(6,6')-bibenzimidazole-2,2'diyl) is prepared from dimethylterephthalate and 3,3'-diaminobenzindine is polyphosphoric acid according to the method described by Y. Iwakura, K. Uno, and Y. Imai, J. Polymer Sci., Pt. A. 1964, pp. 2605–2615. The resulting polymer having an inherent viscosity in concentrated sulfuric acid of 0.8 dL/g (30° C., H$_2$SO$_4$) is dissolved in dimethylformamide containing 3 wt% LiCl. This solution is cast onto a glass slide and the solvent removed by drying at 100° C. in a vacuum oven. The film is floated onto a clean water surface, allowed to remain there to remove LiCl and remaining solvent. The film is picked up on a calcium fluoride plate. It gives the FTIR spectrum shown at the bottom of FIG. 3. The peaks at 1450 and 1290 cm$^{-1}$ are characteristic of the polybenzimidazole.

EXPERIMENTAL EXAMPLE 5

The procedure of Experimental Example 1 is followed except that the trough is placed in an argon atmosphere and that the subphase is a 1 millimolar solution (pH 4.0) of 2,5-diamino-1,4-benzenedithiol, dihydrochloride salt, pH adjusted with 0.1N NaOH. The 2,5-diamino-1,4-benzenethiol dihydrochloride is made according to the method of J. F. Wolfe, B. H. Loo, and F. E. Arnold, Macromolecules 14, 915–920 (1981). After 30 min reaction, a mask is placed on the reacting surface. A thirty-layer film is built up on a Ge IR plate. The FTIR spectrum shows peaks at 1600 and 810 cm$^{-1}$ characteristic of poly[(benzo [1,2-di4,5-d']bis-thiazole-2,6-diyl)-1,4-phenylene].

What is claimed is:

1. A film comprising a heteroaromatic polymer, said heteroaromatic polymer containing the heteroaromatic moiety

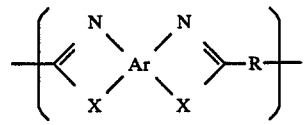

wherein R is aromatic, heteroaromatic, olefinic, acetylenic, or a mixture of these; Ar is an aromatic nucleus and X is an heteroatom selected from the group consisting of NR', S, O, Se, and Te; R' being H, aromatic, or aliphatic; said heteroatoms being in ortho (X, N) pairs; said film comprising a single unit layer of said polymer being of a thickness less than 50 nanometers; and said unit layer being produced by the process comprising the steps of spreading an aldehyde monomer or an aldehyde monomer precursor on the surface of an aqueous solution containing one or more amine monomers, and allowing the reaction to proceed, wherein said aldehyde monomer or aldehyde monomer precursor comprises aromatic, heteroaromatic, olefinic, acetylenic, aliphatic moieties, or a mixture of these, and wherein said aromatic amine monomer is of the formula

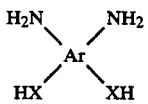

where Ar is an aromatic nucleus, X is a heteroatom seclected from the group consisting of NR', S, O, Se, and Te; R' being H, aromatic, or aliphatic; the functional groups of said aromatic amine monomer being in ortho (XH, $NH_2$) pairs.

2. A film according to claim 1 in which said heteroatom X is NR' and R' is a hydrogen atom.

3. A film according to claim 1 in which said heteroaromatic polymer comprises the repeat unit

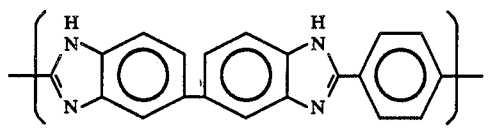

4. A film according to claim 1 in which said heteroaromatic polymer comprises the repeat unit

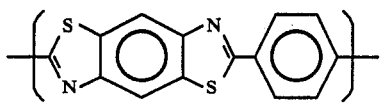

5. A composite material comprised of the film of claim 1 deposited upon the surface of a semiconductor.

6. The composite material of claim 5 wherein said semiconductor is germanium.

7. A process for making a film; said film comprising a heteroaromatic polymer; said heteroaromatic polymer containing the heteroaromatic moiety

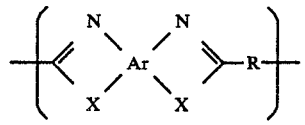

wherein R is aromatic, heteroaromatic, olefinic, acetylenic, or a mixture of these; Ar is an aromatic nucleus and X is a heteroatom selected from the group consisting of NR', S, O, Se, and Te; R' being H, aromatic or aliphatic; said heteroatoms being in ortho (X, N) pairs; said film comprising a single unit layer of said polymer being of a thickness less than 50 nanometers;
said process comprising the steps of spreading an aldehyde monomer or an aldehyde monomer precursor on the surface of an aqueous solution containing one or more amine monomers, and allowing the reaction to proceed; wherein said aldehyde monomer or aldehyde monomer precursor comprises aromatic, heteroaromatic, olefinic, acetylenic, aliphatic moieties, or a mixture of these, and wherein said aromatic amine monomer is of the formula
where Ar is an aromatic nucleus, X is a heteroatom selected from the group consisting of NR', S, O, Se, and Te; R' being H, aromatic, or aliphatic, the functional groups of said aromatic amine monomer being in ortho (XH, $NH_2$) pairs.

8. A method according to the process of claim 7 in which the aldehyde monomer precursor is of the type

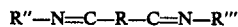

in which R is aromatic, aliphatic, olefinic, or acetylenic; R" and R"' being aliphatic of carbon number 1–16.

9. A method according to the method of claim 8 wherein R is an aromatic nucleus.

10. A method according to the method of claim 8 wherein said aldehyde monomer precursor is dihexylterephthalaldimine.

11. A method according to the method of claim 7 wherein said aromatic amine monomer is of the formula

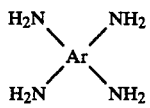

where Ar is an aromatic nucleus of 4–14 carbons and the amino groups are in ortho pairs.

12. A method according to the method of claim 11 wherein said aromatic amine monomer is 3,3'-diaminobenzidine.

13. A method according to the method of claim 7 wherein said aromatic amine monomer is of the formula

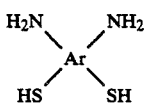

where Ar is an aromatic nucleus of 4–14 carbons and the amino and thio groups are in ortho (SH, $NH_2$) pairs.

14. A method according to the method of claim 13 wherein said aromatic amine monomer is 2,5-diamino-1,4-benzenedithiol.

* * * * *